(12) United States Patent
Nakajima et al.

(10) Patent No.: US 7,978,948 B2
(45) Date of Patent: Jul. 12, 2011

(54) OPTICAL FIBER AND OPTICAL FIBER RIBBON

(75) Inventors: Yasuo Nakajima, Tokyo (JP); Hiroki Tanaka, Tokyo (JP); Yoshihiro Arashitani, Tokyo (JP); Kouji Mochizuki, Tokyo (JP); Mitsunori Okada, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 771 days.

(21) Appl. No.: 11/661,670

(22) PCT Filed: Sep. 8, 2006

(86) PCT No.: PCT/JP2006/318309
§ 371 (c)(1), (2), (4) Date: Mar. 2, 2007

(87) PCT Pub. No.: WO2008/029488
PCT Pub. Date: Mar. 13, 2008

(65) Prior Publication Data
US 2009/0232461 A1    Sep. 17, 2009

(51) Int. Cl.
*G02B 6/02* (2006.01)

(52) U.S. Cl. .......................... 385/128; 385/126

(58) Field of Classification Search .......... None
See application file for complete search history.

(56) References Cited

U.S. PATENT DOCUMENTS

| | | | |
|---|---|---|---|
| 5,146,531 A * | 9/1992 | Shustack | 385/128 |
| 5,259,060 A * | 11/1993 | Edward et al. | 385/128 |
| 5,402,516 A * | 3/1995 | Blyler et al. | 385/141 |
| 7,085,465 B2 | 8/2006 | Ono et al. | |
| 7,209,614 B2 | 4/2007 | Tanaka et al. | |
| 2004/0022512 A1 * | 2/2004 | Sato et al. | 385/128 |

FOREIGN PATENT DOCUMENTS

| | | |
|---|---|---|
| JP | 09-033773 | 2/1997 |
| JP | 2925099 | 5/1999 |
| JP | 2006-113103 | 4/2006 |

OTHER PUBLICATIONS

U.S. Appl. No. 11/794,253, filed Jun. 27, 2007, Nakajima, et al.
U.S. Appl. No. 12/003,435, filed Dec. 26, 2007, Nakajima, et al.
U.S. Appl. No. 11/659,500, filed Feb. 6, 2007, Ono, et al.
U.S. Appl. No. 12/235,123, filed Sep. 22, 2008, Nakajima, et al.
U.S. Appl. No. 12/626,814, filed Nov. 27, 2009, Nakajima, et al.
U.S. Appl. No. 12/770,807, filed Apr. 30, 2010, Nakajima, et al.

* cited by examiner

*Primary Examiner* — Uyen-Chau N Le
*Assistant Examiner* — Chad H Smith
(74) *Attorney, Agent, or Firm* — Oblon, Spivak, McClelland, Maier & Neustadt, L.L.P.

(57) ABSTRACT

The present invention relates to an optical fiber accommodated in an optical fiber cable, and more particularly, to an optical fiber which optimizes optical fiber coating resin and color resin and restrains an increase in transmission loss of the optical fiber due to an operating environment and aged deterioration and provides an optical fiber and optical fiber ribbon without any increase of transmission loss irrespective of the operating environment and aged deterioration, and especially when exposed to water or high humidity.

The optical fiber is an optical fiber coated with at least two layers of coating resin, wherein the outermost coated coating resin is a colored layer made of color resin and when the optical fiber is immersed in water which is heated to 60° C. for 168 hours, an extraction rate of the coating resin of the optical fiber is set to 1.5 mass percent or below.

4 Claims, 1 Drawing Sheet

US 7,978,948 B2

OPTICAL FIBER AND OPTICAL FIBER RIBBON

TECHNICAL FIELD

The present invention relates to an optical fiber or ribbon accommodated in an optical fiber cable. More specifically, the present invention relates to an optical fiber in which coating resin and color resin for the optical fiber are optimized and increases of transmission loss of the optical fiber due to an operating environment and aged deterioration are suppressed.

BACKGROUND ART

In a drawing process of quartz glass, the outer surface of an optical fiber is immediately coated with coating resin to prevent the degradation in strength of the optical fiber. As the optical fiber coating resin, ultraviolet cured resin is mainly used. As the ultraviolet cured resin, a urethane acrylate based resin or epoxy acrylate based resin is used.

In an optical fiber, transmission loss increases due to various external stress and microbends thereby caused. Therefore, to protect the optical fiber from such external stress, an optical fiber is generally provided with a coating having a two-layer structure. Resin with relatively low Young's modulus is used for an inner layer which contacts quartz glass as a buffer layer (hereinafter referred to as a "primary layer") and resin with relatively high Young's modulus is used for an outer layer as a protection layer (hereinafter referred to as a "secondary layer").

The optical fiber is fabricated by producing a quartz glass optical fiber from melting a quartz glass based preform by heating and drawing, using a drawing furnace, then coating with a primary layer and a secondary layer by applying ultraviolet cured resin, using a coating die, to the quartz glass optical fiber, and irradiating this with ultraviolet rays to harden the ultraviolet cured resin. In the next step, the optical fiber produced in this way is coated with a colored layer for identification and a colored optical fiber as shown in FIG. 1 is obtained. An optical fiber coated with coating resin may be generally called an "optical fiber" and one further provided with a colored layer may be called an "colored optical fiber" but an optical fiber subjected to any coating will be referred to as an "optical fiber" in the present specification for convenience of explanation.

Ultraviolet cured resin is generally used for a colored layer, too. A plurality of colored optical fibers obtained as described above are then arranged in parallel as shown in FIG. 2, the outer surface thereof is coated with, for example, a ribbon layer made of ultraviolet cured resin all together, irradiated with ultraviolet rays to harden the ribbon layer to thereby use it as an optical fiber ribbon. Such an optical fiber ribbon is often used mainly as a high density optical fiber cable.

When an optical fiber is used immersed in water for a long period of time, transmission loss may increase. For example, Japanese Patent No. 2925099 (Patent Document 1) discloses that when an optical fiber ribbon is used in a high humidity atmosphere, extraordinary swelling occurs between a secondary layer and a colored layer or between a colored layer and a ribbon layer due to moisture absorption and this causes stress to apply to quartz glass and thereby causes transmission loss to increase. According to the above Patent Document 1, an increase in transmission loss is restrained by optimizing a weight change rate due to water immersion of ink as the colored layer.

With a significant widespread use of optical fibers in recent years, the application of optical fiber cables is expanding. This means that an environment in which optical fiber cables are used is more and more diversified. For this reason, the long-term reliability required for an optical fiber cable is becoming more severe.

Combined with such a situation, even when the weight change rate due to water immersion of ink as the colored layer is optimized as described in the above Patent Document 1, the optical fiber may still be exposed to water immersion and transmission loss may increase.

The inventors have made every effort to study the cause for this and have discovered that in an optical fiber exposed to water immersion and with increased transmission loss, peeling, that is, delamination is often observed not only in a secondary layer/colored layer interface or a colored layer/ribbon layer interface but also in a quartz optical fiber/primary layer interface. When delamination occurs in the quartz optical fiber/primary interface in this way, stress in the part becomes nonuniform and transmission loss increases in the optical fiber by microbends. An issue to be addressed in the present invention is to provide an optical fiber and an optical fiber ribbon whose transmission loss hardly increases even when the optical fiber accommodated in an optical fiber cable is affected in an operating environment and aged deterioration, especially when exposed to water.

SUMMARY OF THE INVENTION (1) The optical fiber according to a first aspect of the present invention comprises an optical fiber coated with at least two layers of coating resin, wherein the outermost coated coating resin is a colored layer made of color resin and when the optical fiber is immersed in water which is heated to 60° C. for 168 hours, an elution rate of the coating resin from the optical fiber is 1.5 mass percent or less.

(2) The optical fiber according to a second aspect of the present invention is the optical fiber core according to the first aspect of the present invention, wherein when the optical fiber before applying the colored layer of the optical fiber thereto is immersed in water which is heated to 60° C. for 168 hours, the elution rate of the coating resin from the optical fiber is made to be 1.5 mass percent or less.

(3) The optical fiber according to a third aspect of the present invention is the optical fiber according to the first aspect of the present invention, wherein the elution rate of the above described coating resin when the above described optical fiber after coating with the above described colored layer is immersed in water which is heated to 60° C. for 168 hours is lower than the elution rate of the above described coating resin when the above described optical fiber before coating with the above described colored layer is immersed in water which is heated to 60° C. for 168 hours.

(4) The optical fiber according to a fourth aspect of the present invention is the optical fiber according to any one of the first, second and third aspects of the present invention, wherein the above described coating resin and the above described color resin are made of ultraviolet cured resin.

(5) The optical fiber ribbon according to a fifth aspect of the present invention is a plurality of the optical fibers according to any one of the first to fourth aspects of the present invention arranged in a plane and coated with ribbon resin all together.

A mechanism in which transmission loss increases when the above described optical fiber is immersed in water is assumed as follows. That is, when a colored optical fiber or optical fiber ribbon is immersed in water, the water penetrates the coating layer and reaches the interface between glass and the primary layer. An adhesive force is generated in the interface between glass and the primary layer, and as described in, for example, the report of Proc. 19$^{th}$ ACOFT, 375 (1994) "Design of Optical Fiber Coating", the adhesive force generally consists of hydrogen bonding with the glass and function in the resin and chemical bonding by an adhesion promoter. However, hydrogen bonding is assumed to be cut by water or the like which invades into the interface between glass and the primary layer. In this way, the adhesive force of the interface between the glass and the primary layer degrades when hydrogen bonding is cut.

On the other hand, if, for example, the elution rate of the coating resin of the optical fiber such as the primary layer, secondary layer or colored layer is large, when the optical fiber is immersed in water, the elution component in the coating resin of the optical fiber dissipates outside the optical fiber together with the spreading and movement of water. The influence of dissipation from the primary layer which is made of soft resin and contacts the glass is considerable. When the optical fiber is immersed in water, if the optical fiber absorbs water in quantity equal to or greater than the amount of elution from the coating resin, no actual volume shrinkage would occur.

However, when the optical fiber is immersed in water for a long period of time, the extractable component is gradually discharged to the outside of the optical fiber. If volume shrinkage of the coating resin of the optical fiber occurs at that time and this continues for a long period of time, a weakness of the adhesive force in the interface between the glass and the primary layer acts in a synergetic manner and provokes partial delamination which further increases transmission loss.

Furthermore, the extractable component of this coating resin is determined by the amount of various reactive additives in addition to non-reactive additives or the amount of unreacted component in case of curing reaction in an optical fiber fabrication process, and the affinity with the molecular structure of the crosslinked part or the like.

Furthermore, while the colored layer is provided for the purpose of identification, the inventors discovered; it is possible to control or restrain the amount of extractable from the coating resin of the optical fiber containing the primary layer and the secondary layer by changing the resin characteristics such as Young's modulus, glass transition temperature and crosslinking density or controlling the components to be added.

Generally, if the colored layer is assumed to be a high polymeric film, permeability is determined by a free volume of the high polymeric film in a glass state, that is, void (holes) at a molecular level or in size approximate thereto, which is often expressed as "micro void", the amount, size, shape and distribution of this micro void. Though gas molecules are theoretically elucidated, in such a case as water which has polarity and has therefore interaction with a high polymeric film, the permeability thereof is complicated. Especially because the extractable component from the coating layer in the present invention is a component which is extracted from the coated layer itself when immersed in water, the interaction with the coating layer is naturally strong and it is difficult to estimate the extractable characteristic, but it is possible to restrain the permeability of the material to be penetrated by increasing Young's-modulus, glass transition temperature and crosslinking density. As the components to be composed, it is possible to increase Young's modulus, glass transition temperature and crosslinking density by adding more multi-functional monomers such as bifunctional monomer.

Furthermore, it is known that the extraction rate in a fiber condition is a value not only determined by the composition of the ultraviolet cured resin for coating but also influenced by the curing condition such as the amounts of illumination and irradiation.

That is, according to the optical fiber of the first and second aspects of the present invention, it is possible to restrain delamination in the interface between the optical fiber and the coating resin such as the glass/primary layer interface which causes an increase in transmission loss by setting the extraction rate of the coating resin of the optical fiber when immersed in water at 60° C. for 168 hours to 1.5% or below. 168 hours is adopted because extractable from the coating resin saturates after a lapse of approximately 168 hours.

According to the optical fiber of the third aspect of the present invention, even when the extraction rate with respect to water for the coating resin provided inside the primary layer and the secondary layer is large, by providing a colored layer made of color resin of a small elution rate with respect to water outside, it is possible to suppress the extraction rate with respect for the whole of coating resin of the optical fiber to water to a small level. Therefore, it is possible to make the restraint on delamination in the interface between the optical fiber and the coating resin which causes an increase in transmission loss, with compatibility with the degree of freedom in the design of the primary layer and the secondary layer.

According to the optical fiber of the fourth aspect of the present invention, it is possible to apply the configurations for restraining delamination according to the first aspect to the third aspect of the present invention to a general type of optical fiber. Main examples of the ultraviolet cured resin used as the coating resin of the optical fiber and the color resin include oligomer, dilute monomer, photoinitiator, chain transfer agent, additives or the like. As oligomer, a urethane acrylate based oligomer, epoxy acrylate based oligomer or polyester acrylate based oligomer is mainly used.

As diluent monomer, mono-functional acrylate or multi-functional acrylate or vinyl monomer such as N-vinyl pyrolidone or N-vinyl caprolactam is used.

According to the optical fiber ribbon according to a fifth aspect of the present invention, it is possible to construct an optical fiber ribbon using the optical fiber according to any one of the first aspect to the fourth aspect. It is possible to known what kind of optical fiber is used for the optical fiber ribbon by measuring the extraction rate and the amount of extractable of the color resin and/or the coating resin of an optical fiber separated from the optical fiber ribbon as a single optical fiber.

DETAILED DESCRIPTION OF EMBODIMENTS

With reference now to drawings, embodiments of the present invention will be explained below.

The following mode is preferable as the best mode for carrying out the present invention. That is, an optical fiber is coated with three layers of coating resin of a primary layer, secondary layer and colored layer, to fabricate an optical fiber. Ultraviolet cured resin is used for each resin. Moreover, a plurality of these optical fibers are arranged in parallel in a plane, and coated with ribbon resin made of ultraviolet cured resin all together to form an optical fiber ribbon.

Figure 1:
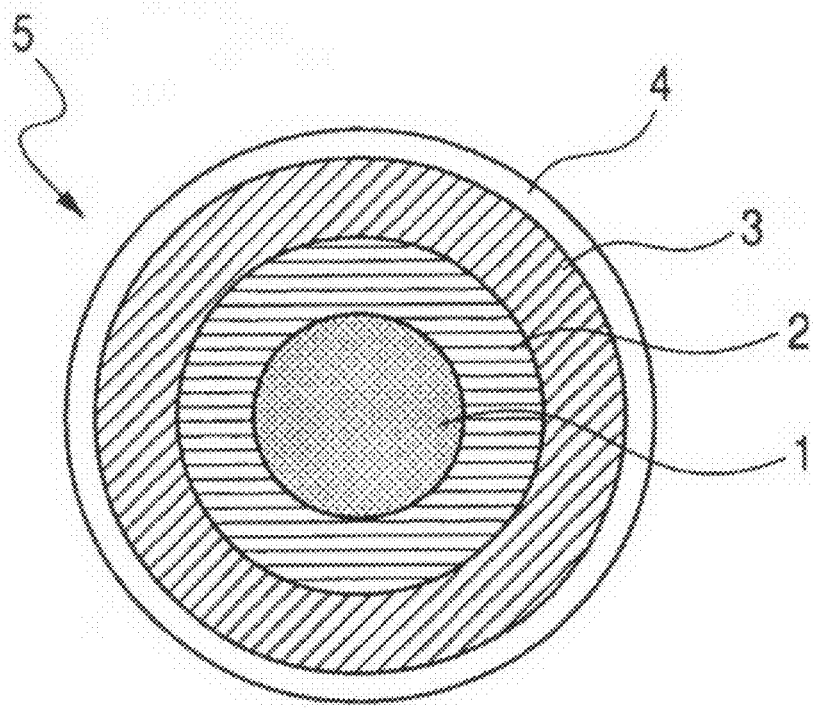
FIG. 1 is a cross-sectional view of an optical fiber.
Figure 2:
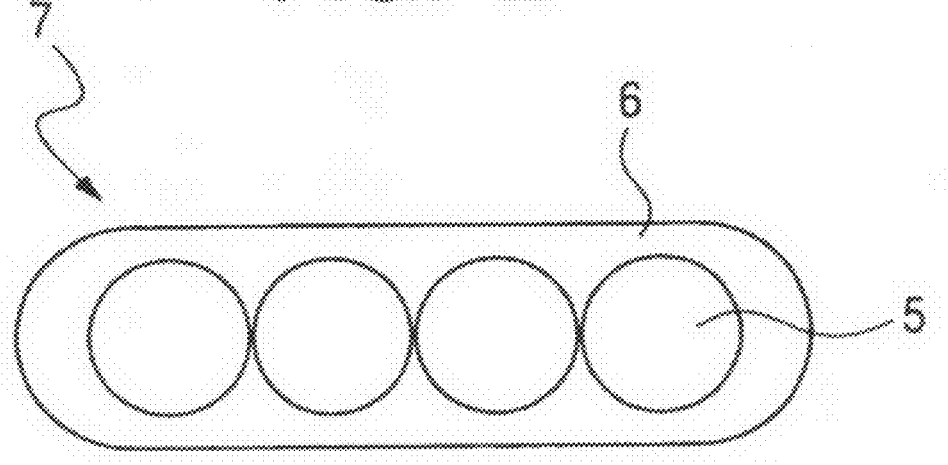
FIG. 2 is a cross-sectional view of an optical fiber ribbon.

As an embodiment of the present invention, several types of optical fibers 5 were fabricated by coating an optical fiber 1 made of quartz glass shown in FIG. 1 with three layers of coating resin of a primary layer 2, a secondary layer 3 and a colored layer 4. Ultraviolet cured resin is used for each resin. The ultraviolet cured resin comprises oligomer, diluent monomer, photoinitiator, chain transfer agent, additives. The several types of optical fibers 5 were fabricated by changing their component materials of the above UV cured resin. Of all embodiments, the outside diameter of the optical fiber 1 made of quartz glass is 125 μm, the outside diameter of the primary layer 2 is 195 μm, the outside diameter of the secondary layer 3 is 245 μm and the outside diameter of the colored layer 4 is 255 μm. Furthermore, as shown in FIG. 2, some of the optical fibers 5 were arranged in parallel in sets of four in a plane and coated with ribbon resin 6 made of ultraviolet cured resin all together as an optical fiber ribbon 7.

The extraction rate and the increase in transmission loss were measured according to the following method. The result is shown in Table for Embodiment Examples 1 to 10 and Comparative Examples 1 to 4. Note that the extraction rate of the coating resin from the optical fiber coated with the primary and secondary layer in this embodiment was measured using the optical fiber before the coating of the coloring layer.

(Method of Measuring Elution Rate)

After drying an optical fiber wire of 5 m long in a thermostatic chamber at 60° C. for 24 hours, the mass (w1) of the resin part thereof is measured by subtracting the mass of the glass part from the mass of the optical fiber wire. Next, the optical fiber wire is immersed in water which is heated to 60° for 168 hours. Next, the optical fiber wire is taken out of water which is heated to 60° C., the optical fiber wire is dried at 50° C. for 24 hours, and then the mass (w2) of the resin part is measured. The elution rate is calculated from the measured w1 and w2 using the following expression.

$$\text{Elution rate (wt \%)} = (w1-w2)/w1 \times 100$$

(Method of Measuring Increases in Transmission Loss)

An optical fiber or optical fiber ribbon of approximately 1 km length was immersed in water which is heated to 60° C. and increases in transmission loss were measured 100 days later. Increases in transmission loss of 0.10 dB/km, less than 0.10 dB/km, and especially less than 0.03 dB/km were judged as "x", "○" and "⊚" respectively, as indicated in TABLE. With regard to the measurement of increases in transmission loss, the loss of a 1.55 μm band in the longitudinal direction was measured from an optical backscattering loss coefficient (OTDR) using an optical pulse test equipment MW9060A manufactured by Anritsu Corporation.

TABLE

| | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 | Comp. Ex. 4 |
|---|---|---|---|---|---|---|---|---|---|---|---|---|---|---|
| Elasticity modulus of primary layer (MPa) | 0.8 | 0.8 | 1.1 | 1.1 | 1.1 | 1.1 | 1.1 | 1.1 | 0.8 | 0.8 | 0.8 | 0.8 | 0.8 | 0.8 |
| Elasticity modulus of secondary layer (MPa) | 500 | 500 | 870 | 870 | 870 | 870 | 870 | 870 | 500 | 500 | 500 | 500 | 500 | 500 |
| Extraction rate (mass percent) of coating resin from optical fiber when primary layer and secondary layer are coated | 1.7 | 1.7 | 0.5 | 0.5 | 0.5 | 0.5 | 0.5 | 0.5 | 1.7 | 1.7 | 1.7 | 1.7 | 1.7 | 1.7 |
| Extractin rate (mass percent) of coating resin from optical fiber when colored layer is coated | 0.5 | 0.5 | 0.7 | 0.7 | 0.3 | 0.3 | 0.4 | 0.4 | 1.4 | 1.4 | 1.8 | 1.8 | 1.6 | 1.6 |
| Elasticity modulus of colored layer (MPa) | 1600 | 1600 | 1600 | 1600 | 1600 | 1600 | 1600 | 1600 | 1050 | 1050 | 960 | 960 | 960 | 960 |
| Glass transition temperature of colored layer (° C.) | 95 | 95 | 95 | 95 | 95 | 95 | 95 | 95 | 85 | 85 | 80 | 80 | 80 | 80 |
| Condition during measurement of transmission loss | fiber | Ribbon | fiber | Ribbon | fiber | Ribbon | fiber | Ribbon | fiber | Ribbon | fiber | Ribbon | fiber | Ribbon |
| Increase in transmission loss (dB/km) 60° C. × 100 days later, 1.55 μm | 0.01 | 0.03 | 0.02 | 0.03 | 0.00 | 0.00 | 0.00 | 0.00 | 0.04 | 0.08 | 0.10 | 0.12 | 0.20 | 0.24 |
| Judgment | ⊚ | ○ | ⊚ | ○ | ⊚ | ⊚ | ⊚ | ⊚ | ○ | ○ | X | X | X | X |

As is clear from the descriptions above, it has been proved that the present invention provides an optical fiber coated with at least 2 layers of coating resin, wherein the outermost coated coating resin is a colored layer made of color resin and when the optical fiber immersed in water which was heated to 60° C. for 168 hours, an extraction rate of the above coating resin from the optical fiber was 1.5 mass percent or below, an increase in transmission loss was less than 0.10 dB/km and transmission loss hardly increased. Furthermore, the extraction rate of the coating resin from the optical fiber when the primary and secondary layers were coated was also made to be 1.5 mass percent or below and an increase in transmission loss was thereby less than 0.03 dB/km even when the optical fiber was immersed in hot water at 60° C. for 100 days, and in this way an excellent result was obtained. It has been proved that these effects were obtained in both the condition of the optical fiber (Embodiment Examples 1, 3, 5, 7) and the condition of the optical fiber ribbon (Embodiment Examples 2, 4, 6, 8). On the other hand, in the cases of Comparative Examples 1 to 4, it has been proved that when the extraction rate from the colored optical fiber after immersing in water which is heated to 60° C. was 1.5 mass percent or above, an increase in transmission loss was 0.1 dB/km or above, that is, transmission loss increased.

As described above, according to the present invention, it is possible to obtain an optical fiber and an optical fiber ribbon whose transmission loss does not increase irrespective of the operating environment or time variation or even when exposed to water or a high humidity atmosphere.

The invention claimed is:

1. An optical fiber comprising:
  a colored optical fiber coated with at least three layers of coating resin of ultraviolet cured resin, the three layers comprising a primary layer, secondary layer and outermost colored layer,
  wherein the secondary layer has elasticity modulus of 500 MPa or larger and the outermost colored layer has elasticity modulus of 1050 MPa or larger, glass transition temperature of 85° C. or higher and is made of color resin, and an extraction rate of said coating resin is 1.5 mass percent or below when, an unfinished colored optical fiber with the primary and secondary layers before being coated with the colored layer, is immersed in water which is heated to 60° C. for 168 hours, and
  the extraction rate of said coating resin when said colored optical fiber coated with the primary, secondary and colored layers is immersed in water which is heated to 60° C. for 168 hours is lower than the extraction rate of said coating resin when, said unfinished colored optical fiber with the primary and secondary layers before being coated with the colored layer, is immersed in water which is heated to 60° C. for 168 hours.

2. An optical fiber ribbon comprising a plurality of the optical fibers according to claim 1 arranged in a plane and coated with ribbon resin all together.

3. An optical fiber comprising:
  a glass colored optical fiber coated with at least three layers of coating resin of ultraviolet cured resin, the three layers comprising a primary layer, a secondary layer and outermost colored layer,
  wherein the outermost colored layer is made of color resin, and an extraction rate of said coating resin is 1.5 mass percent or below when, an unfinished colored optical fiber with the primary and secondary layers before being coated with the colored layer, is immersed in water which is heated to 60° C. for 168 hours, and
  the extraction rate of said coating resin when said colored optical fiber coated with the primary, secondary and colored layers is immersed in water which is heated to 60° C. for 168 hours is lower than the extraction rate of said coating resin when, said unfinished colored optical fiber with the primary and secondary layers before being coated with the colored layer, is immersed in water which is heated to 60° C. for 168 hours.

4. The optical fiber of claim 1, wherein the ultraviolet cured resin includes a chain transfer agent.

* * * * *